C. & L. SAND.
FEED WEIGHING DEVICE FOR LIVE STOCK.
APPLICATION FILED MAR. 18, 1916.
1,247,158.
Patented Nov. 20, 1917.
2 SHEETS—SHEET 1.
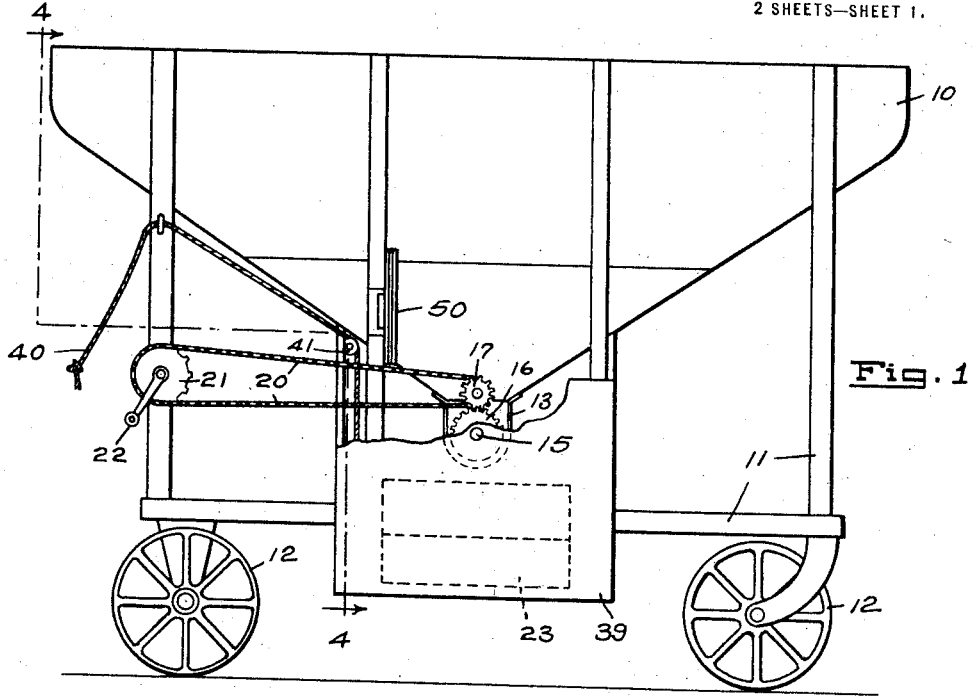
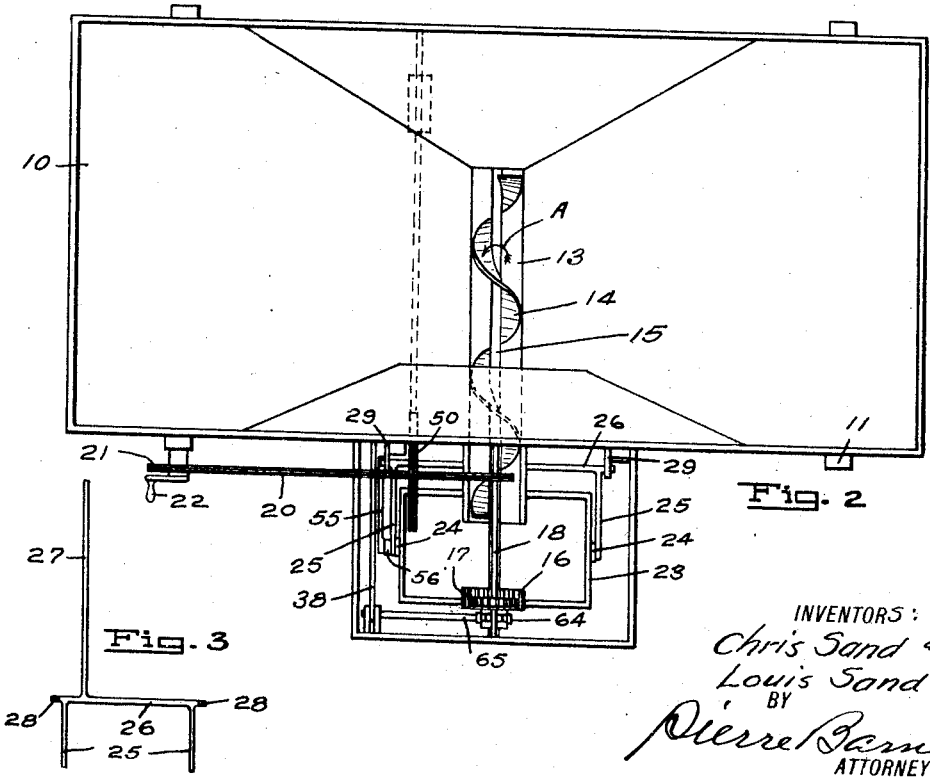
INVENTORS:
Chris Sand and
Louis Sand
BY
Pierre Barnes
ATTORNEY

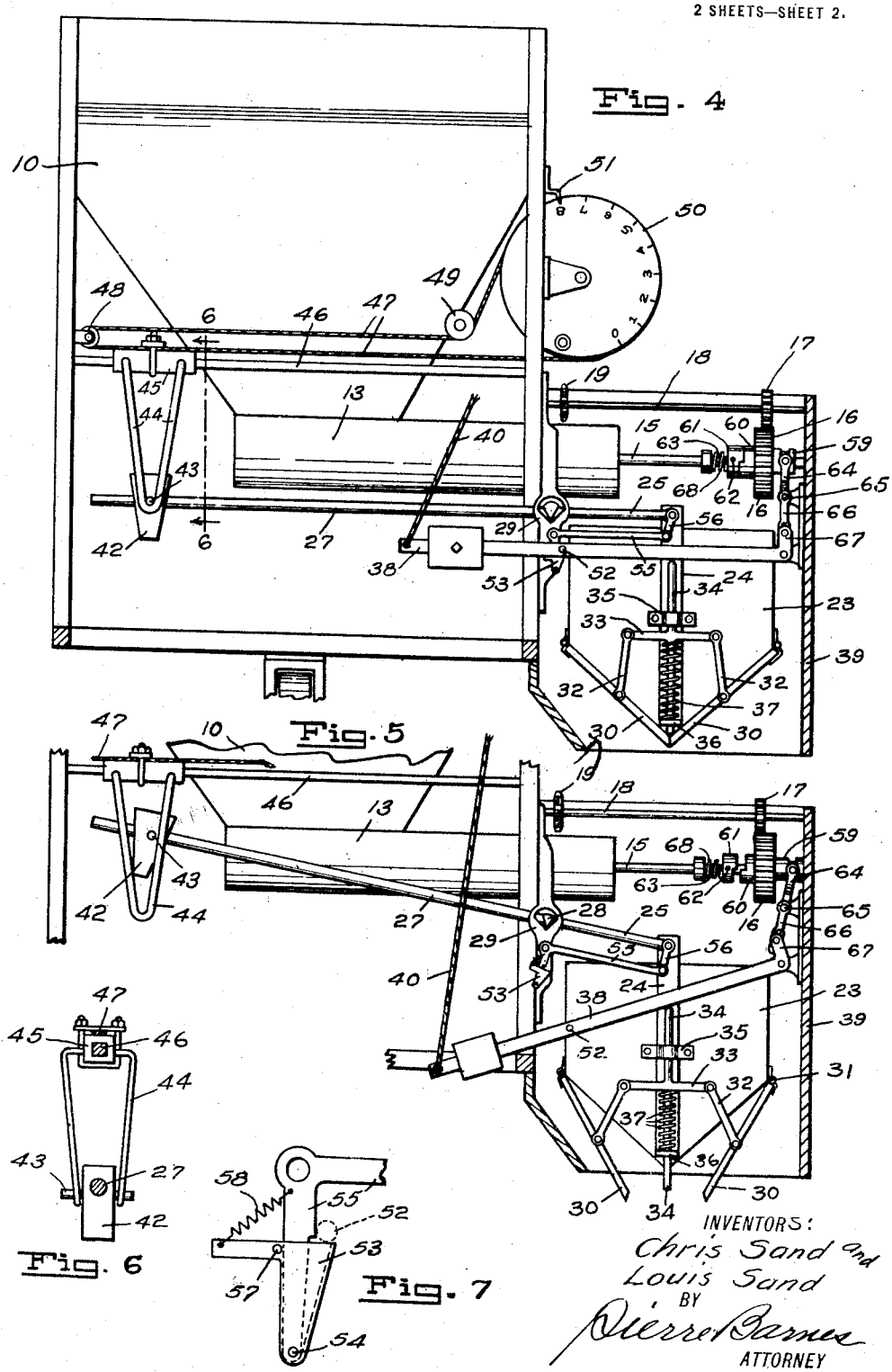

UNITED STATES PATENT OFFICE.

CHRIS SAND AND LOUIS SAND, OF KIRKLAND, WASHINGTON.

FEED-WEIGHING DEVICE FOR LIVE STOCK.

1,247,158.  Specification of Letters Patent.  Patented Nov. 20, 1917.

Application filed March 18, 1916. Serial No. 85,007.

*To all whom it may concern:*

Be it known that we, CHRIS SAND and LOUIS SAND, citizens of the United States, residing at Kirkland, in the county of King and State of Washington, have invented certain new and useful Improvements in Feed-Weighing Devices for Live Stock, of which the following is a specification.

This invention relates to improvements in portable apparatus for feeding live stock and the object of this improvement is to provide a portable feed hopper together with apparatus for weighing and discharging feed therefrom that may be wheeled from stall to stall in a stock barn and operated to discharge a predetermined amount of feed into the feed troughs of live stock, as cattle, that may be stabled in the barn.

The invention consists in the novel construction of weighing and discharging apparatus, and the adaptation and combination of such apparatus with a portable hopper, as will be more clearly described in the following specification, illustrated in the accompanying drawings, and finally pointed out in the appended claims.

In feeding live stock, particularly cattle, it is desirable, if the best results are to be secured, that each animal be fed a certain number of pounds of feed for each ration and in instances where a large number of cattle are to be fed and the weight of the ration varies for different animals, it is a long and tedious process to weigh out and serve each ration.

The apparatus herein described makes it possible accurately and quickly to weigh each individual ration and deliver it into the feed trough of the animal.

In the accompanying drawings, Figure 1 is a view in side elevation of a device embodying the invention; Fig. 2 is a plan view of the same; Fig. 3 is a plan view on a reduced scale of a detail of the invention; Fig. 4 is a view partly in cross-section and partly in elevation substantially on broken line 4—4 of Fig. 1; Fig. 5 is a view similar to Fig. 4, showing a different operative position of certain mechanism and showing certain parts broken away; Fig. 6 is a view in cross-section on broken line 6—6 of Fig. 4 and Fig. 7 is an enlarged view in side elevation of a detail of the invention.

Referring to the drawings, throughout which like reference numerals indicate like parts, the numeral 10 indicates a hopper that is supported on frame members 11 which are mounted on wheels 12 in order that the hopper may conveniently be wheeled about on the floor of a barn.

The bottom of the hopper converges toward the center and terminates in a transversely disposed U-shaped trough 13 within which is provided a helicoidal conveyer screw 14 that is secured on a shaft 15. The shaft 15 carries a wide-faced gear wheel 16 that meshes with another gear wheel 17 on a shaft 18 that carries a sprocket wheel 19 that is connected by a sprocket chain 20 with a sprocket drive wheel 21 having a crank handle 22 provided thereon by which it may be turned to drive the screw 14.

The trough 13 projects outwardly from the side of the hopper 10 and terminates above the center of a dump-box 23 that is provided on both ends with vertical bars 24 the tops of which are articulated with the short arms 25 of a scale-bar 26 which is provided with a weight arm 27 (see Fig. 3) whereby the weight of the box 23 and any desired overweight is counterbalanced.

The ends of the scale bar 26 are provided with V-shaped bearings 28 that rest within bearing brackets 29 that are secured to the frame 11.

The bottom of the dump box 23 is preferably V-shaped and is closed by two flaps 30 that are articulated by hinges 31 with the edges of the box, and are adapted to swing outwardly into the position shown in Fig. 5 to permit the contents of the box to be discharged.

The flaps 30 are normally held in a tightly closed position by mechanism consisting in links 32 that are pivoted on the ends of a horizontal cross-bar 33 that is formed integral with or otherwise rigidly secured to a vertical rod 34 disposed to move in guides 35 and 36 on the end of the box 23 and having a helical compression spring 37 interposed thereon between the cross-bar 33 and the guide 36.

The flaps 30 are adapted to be opened by the pressure of a weighted arm 38 which is permitted to drop on the top of the rod 34 when the outer end of the scale-arm 27 is raised, the weighted arm 38 being pivoted at one end to a side wall 39 and being connected at its other end with a cable 40 which extends over a pulley 41 to within easy reach of an operator, as shown in Fig. 1, whereby the bar may be lifted from its lowered position.

The scale arm 27 is provided with a slidably disposed weight 42 having laterally projecting pins 43 that extend outwardly through V-shaped shifter-bars 44 which are secured to a block 45 that is slidable on a square bar 46. The block 45 is secured to a cable 47 that passes over pulleys 48 and 49 and around a dial plate 50 to which it is secured at one point only whereby the shifter block 45 may be moved by turning the dial 50. The dial 50 is preferably graduated to read in pounds and moves under a pointer 51 that is secured to the frame 11 in a position where it is easily visible to the operator, whereby the weight 42 may be set so that the box 23 will trip at any desired load.

The weighted bar 38 is provided with a pin 52 that is adapted to rest on the top edge of a trip block 53 that is secured by a pivot 54 to the short arm of a bell-crank lever 55 that is pivoted to the bracket 29 and has its outer end articulated by a link 56 with the side bar 24 on the box 23 whereby, when the box 23 is lowered, the trip block 53 will be moved outwardly, as shown in Fig. 5, and the bar 38 permitted to drop.

The trip block 53 is provided with a stop in the form of a pin 57 that is held in contact with the back of the short arm of the bell-crank lever 55 by a helical tension spring 58 and permits the pin 52 to be moved upwardly past the plate 53 after the bell crank 55 has assumed the position shown in Fig. 4.

The gear wheel 16 is slidable on the shaft 15 and is provided with a clutch element 60 that is adapted to engage with another clutch element 61 which is secured to the shaft 15 by a pin 62 that passes through a slot 63 in the shaft.

The clutch element 61 is normally pressed to the limit of its outward movement by a compression spring 68 but is permitted by such spring to move inwardly during the engaging movement of the clutch.

The outer hub 59 of the gear wheel 16 is engaged by a shifter fork 64 that is secured on a shaft 65 that is rigidly connected with the top end of a lever arm 66, the bottom end of the lever arm 66 being connected by a slot and pin connection with a short arm 67 that is formed integral with the weight arm 38 at substantially right angles thereto, whereby when the weight arm is raised, the clutch element 60 will be moved into engagement with the clutch element 61 and when the weight arm 38 is lowered, said two clutch elements will be disengaged.

In operation, the hopper is filled with feed and the device is wheeled along the barn floor in front of the animals that are to be fed, the floor on which the feeder is wheeled preferably being about on a level with the top of the mangers of the animals in order that the dump-box 23 may discharge directly into such mangers or into chutes that are connected with such mangers.

The dial 50 is set to the weight of feed desired, and the screw 14 is then rotated in the direction indicated by the arrow A by turning the sprocket wheel 21, thus causing the screw to discharge feed into the dump-box 23. When the weight of the feed in the dump-box 23 overbalances the scale-weight 42, the dump box will move downwardly and the scale-weight upwardly, as shown in Fig. 5, and after the box 23 has about reached the limit of its downward movement the weight arm 38 will be released and will drop on the top of the bar 34, thus opening the flaps 30 and at the same time disengaging the clutch 60 and stopping the feed-screw 14.

After the box 23 has discharged its contents, a pull may be exerted on the cable 40 to lift the bar 38, whereupon the scale-weight 42 will automatically lift the box 23 into the position shown in Fig. 4 and the spring 37 will close the flaps 30. The device is then ready to weigh out another ration.

As the bar 38 is raised, the pin 52 engages the trip-block 53 and presses it outwardly against the tension of the spring 58 until such pin has passed the top of the trip member, whereupon the tension of the spring 58 causes the trip member to snap back and sustain the weight of the bar until the scale weight is again raised.

The disengaging of the clutch 60 simultaneously with the dropping of the bar 38 precludes the possibility of the operator continuing to discharge feed while the machine is dumping.

It will be obvious that the same apparatus may be employed as a stationary feeding bin in a barn from which predetermined rations may be delivered and fed to the stock.

What we claim as our invention, is—

1. A device of the class described comprising a portable hopper, a dump box adapted to receive material from said hopper, a manually operable conveyer for discharging material from said hopper into said dump box, means for rendering said conveyer inoperative while said dump box is discharging, and manually operated means for restoring said conveyer to operative position.

2. A device of the class described comprising a portable frame, a hopper thereon, a scale beam pivotally supported by the frame adjacent the hopper, said scale beam having a weight movable lengthwise thereover, a dump box articulated with the other end of said scale beam, hand-operated feeding devices for transferring material from said hopper into said dump box, and mechanism for automatically dumping said box when a predetermined weight of material has been discharged thereinto and rendering the hand-operated feeding devices inoperative, and means for returning the feeding devices to operative position.

3. A device of the class described comprising a portable frame, a hopper thereon, scale mechanism, a dump box controlled in its operation by said scale mechanism, a screw conveyer for discharging material from said hopper into the said dump box, means supported by the frame adapted to be released by the presence of a predetermined weight of material in said box to dump said box, mechanism for rendering said screw conveyer inoperative while said dump box is in dumping position, and manually-operated means for restoring said screw conveyer to operative position.

4. A device of the class described, comprising a portable frame, a hopper thereon, scale mechanism, a dump-box suspended on said scale mechanism, a screw to deliver material from said hopper into said dump-box, means for rotating said screw, a weighted arm supported by the frame adapted to be released by the opening of said dump-box to cause said dump-box to discharge its load, and mechanism connected with said arm for disconnecting said screw-rotating means when said dump-box is lowered and means for raising the weighted arm to an inoperative position and simultaneously restore connection of the screw rotating means.

5. A device of the class described, comprising a frame, a hopper, a scale-arm fulcrumed on said frame and having a weight adjustable on one end thereof, a dump-box on the other end of said scale arm, devices for feeding material from said hopper into said dump-box, a pivoted weight supported by the frame adapted to be released by the lowering of said dump-box to open said dump-box, means for rendering said feeding devices inoperative when said dump-box is lowered, and means for lifting said weight to restore the feeding devices to operative positions.

6. A device of the class described, comprising a portable frame, a hopper on said frame, scale mechanism fulcrumed on said frame, a dump-box articulated with said scale mechanism and disposed at the side of said frame, devices for feeding material from said hopper into said dump-box, flaps hinged to the bottom of said box, a vertically movable plunger having a link connection with said flaps and being tensioned to keep said flaps closed, a weighted arm adapted to be supported above said plunger, means for automatically releasing said arm in response to a lowering movement of said dump-box whereby said arm may fall on said plunger and open said flaps, means for rendering said feeding devices inoperative when said weighted arm is lowered, and means for lifting said weighted arm to restore the feeding devices to operative positions.

7. A device of the class described, comprising a portable frame, a hopper, a scale beam fulcrumed on said frame, a weight movable on one end of said scale beam, a graduated dial supported by said frame, a cable on said dial and connected with said scale-weight whereby said scale-weight may be moved by turning said dial, a dump-box suspended from the other end of said scale-beam, devices for feeding material from said hopper into said dump-box, apparatus adapted to be released by the lowering of said dump-box to open said dump-box, and means for restoring the apparatus to its initial position to permit said dump box to be closed.

8. A feed-weighing device comprising a portable frame, a hopper, a scale-beam fulcrumed on said frame, a feed-box suspended from one end of said scale-beam, a weight slidable on the other end of said scale-beam, said weight having laterally projecting pins, a fixed bar, a block movable thereon, converging weight-adjusting members adapted to engage said pins, means for moving said block to adjust said weight, dumping apparatus for said feed-box, means adapted to be released by the lowering of said feed-box to operate said dumping apparatus, and means for restoring the apparatus to its initial position to permit said dump box to be closed.

9. Apparatus of the class described, comprising a fulcrumed scale-beam having a weight on one end thereof, a receptacle suspended from the other end of said scale beam, flaps hingedly secured and forming the bottom side of said receptacle, links connected with said flaps, a vertically movable spring-pressed rod connected with said links, a weight disposed above said rod, trip mechanism supporting said weight and adapted to be released by the lowering of said receptacle to permit said weight to drop on said rod and open said flaps, and a spring-actuated trip-block on said trip mechanism to permit said weight to be raised simultaneously with the raising of said receptacle and means for raising the weight.

10. A device of the class described, comprising a frame, a hopper mounted on said frame, a feed screw positioned within the bottom of said hopper, a scale-beam supported by said frame, an adjustable weight on said scale-beam, a slidable block on said frame having downwardly projecting members that engage said weight, a rotatable dial plate on said frame, a cable secured to said plate and to said block whereby said block may be moved by the turning of said dial plate to change the position of the weight on the scale beam, a dump box, said dump-box being articulated with said scale-beam, flap doors hinged to the bottom of said box, spring-actuated means for closing said doors, a weight arm adapted to drop on said door-closing means to open said doors, a cable for lifting said weight arm, trip mechanism for supporting said weight arm in a raised position and adapted to release said weight arm when said feed-box is lowered, means for rotating said screw, and devices connected with said weight arm for disconnecting and connecting said screw-rotating means when said weight arm is lowered and raised, respectively.

11. A device of the class described comprising a frame, a hopper mounted thereon, a dump box adapted to receive material from said hopper, tensioned closure flaps for said dump box, hand operated means for feeding material from said hopper to said dump box, scale mechanism mounted on said frame and operatively connected to said dump box, means adapted to cause said tensioned flaps to open when a predetermined weight is received in said dump box and simultaneously to render said manual feeding means inoperative, said last-named means adapted to be operated for restoring the feeding devices to operative position.

12. A device of the class described comprising a frame, a hopper mounted thereon, a dump box adapted to receive material from said hopper, means for feeding material from said hopper to said dump box, scale mechanism mounted on said frame and connected with said dump box, closure doors for said dump box, means operatively connected with said scale mechanism for simultaneously opening said dump box closure doors and rendering said feeding means inoperative, said last-named means adapted to be operated for restoring the feeding devices to operative position.

13. A device of the class described comprising a frame, a hopper mounted thereon, a dump box adapted to receive material from said hopper, means for conveying the material from the hopper to said dump box, a scale arm pivoted on said frame and operatively connected to said dump box, a weighted arm pivoted on said frame, tensioned closure doors for said dump box adapted to be engaged by said weighted arm when a predetermined weight is received in said dump box, and clutch mechanism for said conveying means adapted to be operated by said weighted arm to render said conveying means inoperative when said tensioned closure doors for the dump box are open, said clutch and conveyer mechanism adapted to be operated for restoring the feeding means to operative position.

14. A device of the class described comprising a frame, a hopper mounted thereon, a dump box adapted to receive material from said hopper, means for conveying the material from the hopper to said dump box, a scale arm pivoted on said frame and operatively connected to said dump box, a weighted arm pivoted on said frame, tensioned closure doors for said dump box adapted to be engaged by said weighted arm when a predetermined weight is received in said dump box, clutch mechanism for said conveying means adapted to be operated by said weighted arm to render said conveying means inoperative when said tensioned closure doors for the dump box are open, and manually operated means for elevating said weighted arm to permit the tensioned dump box doors to close and restore the conveyer clutch and conveyer to operative position.

15. A device of the class described comprising a frame, a hopper mounted thereon, a dump box adapted to receive material from said hopper, a scale arm pivoted on said frame and operatively connected to said dump box, an adjustable weight on said scale arm, and means for adjusting said weight including a dial plate rotatably supported on said frame and having a flexible connection with said weight whereby the same may be adjusted relative to the scale arm for controlling the amount of material received in said dump box previous to dumping.

Signed at Seattle, Washington, this 25th day of February, 1916.

CHRIS SAND.
LOUIS SAND.

Witnesses:
E. PETERSON,
HORACE BARNES.

Copies of this patent may be obtained for five cents each, by addressing the "Commissioner of Patents, Washington, D. C."